April 12, 1955 H. T. PATMORE 2,706,086
HOUSE HEATING APPARATUS
Filed March 23, 1951 3 Sheets-Sheet 2
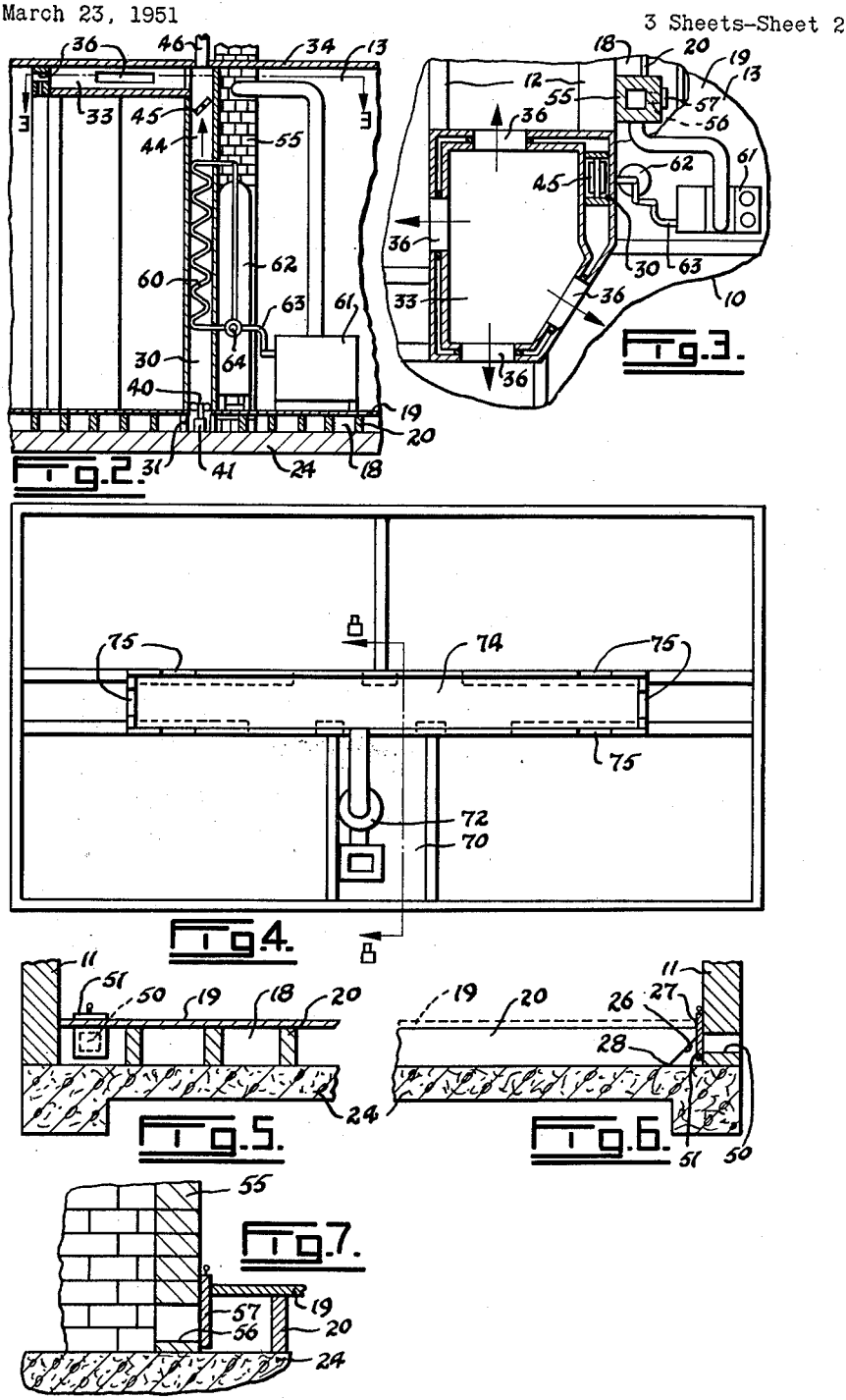
INVENTOR
HENRY T. PATMORE
BY
Fetherstonhaugh & Co.
ATTORNEYS April 12, 1955     H. T. PATMORE     2,706,086
HOUSE HEATING APPARATUS Filed March 23, 1951     3 Sheets-Sheet 3

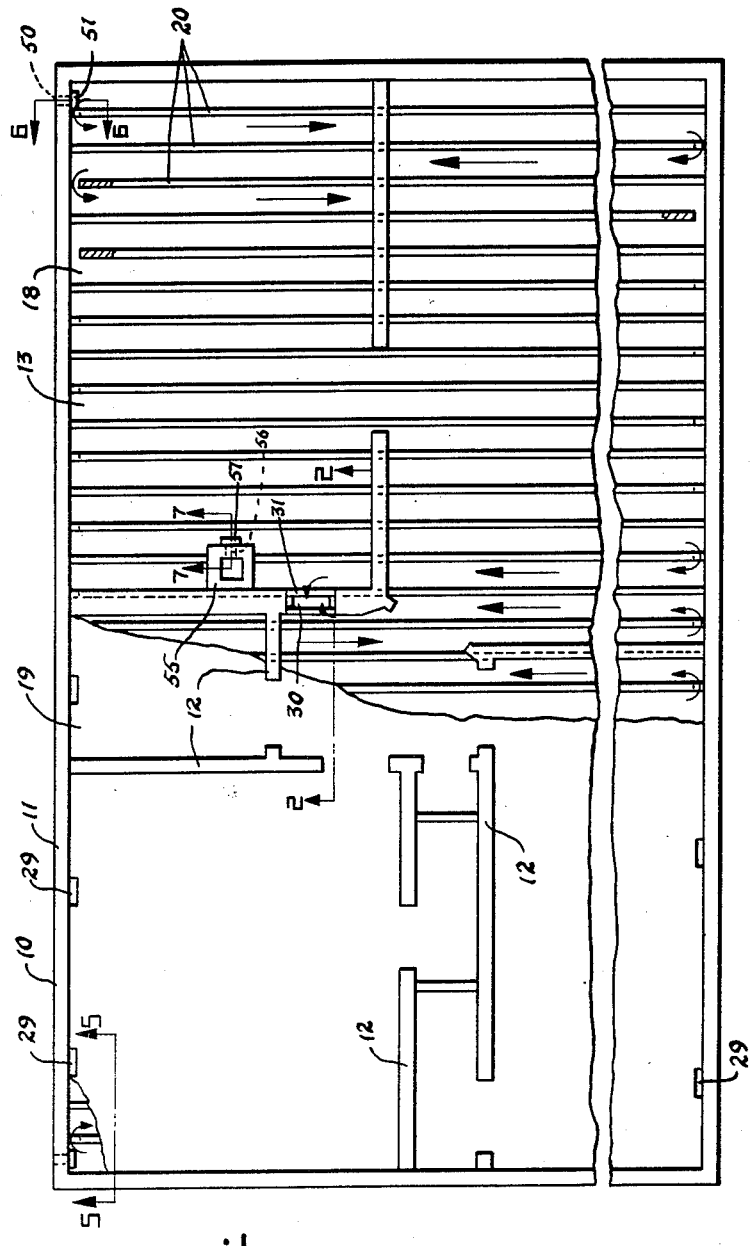

INVENTOR
HENRY T. PATMORE
BY
Fetherstonhaugh & Co.
ATTORNEYS

United States Patent Office 2,706,086
Patented Apr. 12, 1955

2,706,086

HOUSE HEATING APPARATUS

Henry T. Patmore, New Westminster, British Columbia, Canada

Application March 23, 1951, Serial No. 217,159

6 Claims. (Cl. 237—46)

This invention relates to improvements in apparatus for heating houses.

An object of the present invention is the provision of house heating apparatus designed particularly to operate with an ordinary cooking stove or an oil heater in one room to heat all the other rooms in the house.

Another object is the provision of house heating apparatus which does not require a lot of pipes or conduits for conveying heat to the different rooms.

A further object is the provision of apparatus for heating the entire floor area of a house.

A still further object is the provision of house heating apparatus by means of which the air in the house may be quickly changed without opening any windows or doors, and by means of which the fresh air is warmed before it enters the rooms.

This apparatus consists of a circulating duct winding back and forth beneath the floor of the house in a plurality of transverse runs, a cold air outlet in each room of the house adjacent the floor communicating with the duct, a vertical heating chamber communicating at its lower end with the duct, means in the heating chamber for heating the air therein, a distribution duct adjacent the house ceiling communicating with the upper end of the heating chamber, and a hot air outlet in the distribution duct communicating with each room. The hot air rises in the heating chamber and draws air into the latter from the circulating duct. At the same time, the hot air at the top of the chamber passes into the distribution duct, whence it is directed into the rooms through the air outlets. If desired, the circulating duct may be provided with a controlled air inlet communicating with the atmosphere outside the house, and this duct may also have a controlled air outlet communicating with the bottom of a chimney. One way of heating the air in the heating chamber is to use a hot water coil to which water from a water heater passes on its way to a hot water tank. If desired, this tank may also be in the heating chamber, and it is also possible to provide a special heater in this chamber instead of the coil.

Figure 8:
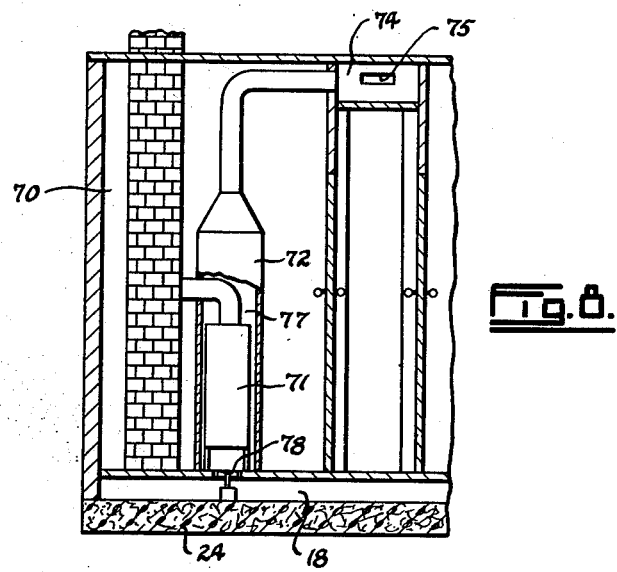
Figure 9:
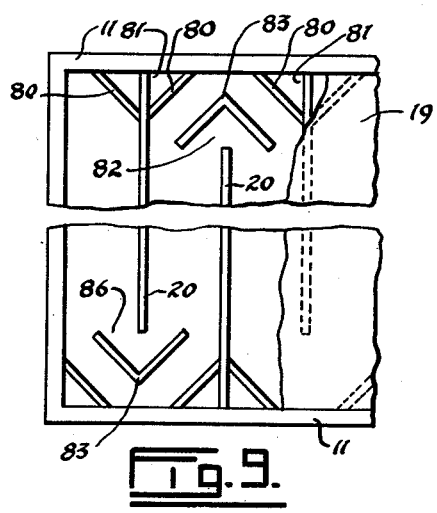

Examples of this invention are diagrammatically illustrated in the accompanying drawings, in which:

Figure 1 is a plan view of the floor of a house including this heating apparatus, with part of the floor removed to reveal the circulating duct, Figure 2 is a vertical section taken substantially on the line 2—2 of Figure 1, Figure 3 is a horizontal section taken substantially on the line 3—3 of Figure 2, Figure 4 is a plan view of a house with the roof and ceiling removed, showing an alternative form of this apparatus, Figure 5 is an enlarged fragmentary section taken on the line 5—5 of Figure 1, Figure 6 is an enlarged section taken on the line 6—6 of Figure 1, Figure 7 is an enlarged fragmentary section taken on the line 7—7 of Figure 1, Figure 8 is a section taken on the line 8—8 of Figure 4, and Figure 9 is an enlarged plan view of an alternate form of staggered floor joist construction.

Referring to the drawings, 10 is a house having an outer wall 11 and a plurality of partitions 12 arranged to form the various rooms of the house, the area 13 representing the kitchen.

A circulating duct 18 is formed beneath the floor 19 of the house. This duct is in the form of a plurality of transverse runs separated by joists 20. The joists may be placed on an insulated concrete base 24, see Figure 5. At least a portion of one end of at least some of the joists is spaced from the adjacent house wall. This may be accomplished by forming one end of some of the joists with a bevel 26 which extends inwardly from the top 27 to the bottom 28 thereof, see Figure 6. In the illustrated form of the invention, each joist has one bevelled end and these are staggered in relation to each other.

Each room in the house is provided with one or more cold air outlets 29 communicating with the circulating duct. These outlets may be in the floor adjacent the wall 10 of the building or they may be in said wall. Furthermore, suitable means may be provided for controlling these openings.

A vertical heating chamber 30 is provided in the house. It is preferable to have this chamber located centrally of the house, although this is not absolutely necessary. In this example, the chamber is formed in one of the partitions 12, but it may be constructed outside the partition. The heating chamber communicates at its lower end with the circulating duct 18 at 31, and it communicates at its upper end with a distribution duct 33 located adjacent the ceiling 34 of the house. This distribution duct is shaped and located so that it is near each room of the house, and it has a hot air outlet 36 for each room. When the distribution chamber is located centrally of the house, the circulating duct 18 is formed in two sections, one section extending from one end of the wall of the house to the heating chamber, and the other section from the opposite end of the house to said chamber, each one opening into the bottom of the chamber.

If desired, a fan 40 driven in any suitable manner, such as by an electric motor 41, may be located adjacent the bottom of the chamber 30. Furthermore, this chamber may have an outlet 44 adjacent its upper end which is controlled by a damper 45. An air inlet 50 may be provided at the outer end of each section of the circulating duct 18. This inlet extends through the wall of the house and communicates with the atmosphere outside thereof. Each of these inlets may be controlled by a gate 51. The house has a chimney 55 which extends down to the concrete base 24. If desired, each section of the circulating duct may have an air outlet 56 in the bottom of the chimney which is controlled by a gate 57.

If it is desired to change the air without opening a window, a controlled outlet may be provided at the top of the chamber 30 or in the duct 33, such as diagrammatically illustrated at 46 in Figure 2. When this outlet and an inlet gate 51 are left partially open, some of the air is always being replaced as the air is circulated through the system.

Suitable means is provided for heating the air in the chamber 30. One way of doing this is to place a hot water coil 60 therein. The house is provided with a hot water heater 61 which may be an ordinary cooking stove, and a hot water tank 62. A pipe 63 extends from the heater to the tank for directing hot water to the latter. One end of the coil 60 may be connected to this pipe, while the other end of said coil may extend directly to the tank or to the pipe adjacent the tank. A valve 64 is located at the junction of the pipe 63 at the lower end of the coil and this valve is controlled by a thermostat not shown. The valve is operated by the thermostat to direct hot water either through the coil 60 or directly to the tank through the pipe 63. While the tank 62 has been shown in the kitchen of the house, it is obvious that the heating chamber 30 may be large enough to accommodate it along with the coil 60.

In the alternative form of the invention illustrated in Figures 4 and 8, a utility room 70 is built in the house. A heater 71 of any suitable type, such as an oil heater, is located in this room, and is provided with a jacket 72 surrounding it which communicates at its lower end with the circulating duct 18 and at its upper end with a distribution duct 74 having outlets 75 communicating with the rooms of the house. The jacket 72 actually forms a heating chamber 77 around the heater. A fan 78 may be provided for directing air from the circulating duct into and through the heating chamber 77.

In the form of the invention illustrated in Figures 1 to 3 and 5 to 7, the air in the heating chamber 30 is heated by the hot water coil 60. This air rises in the chamber and passes into the distribution duct 33 and out into the rooms of the house through the hot air outlets 36 adjacent the tops of said rooms. If desired, these outlets may be provided with means for closing them off or regulating the amount of air passing through them. As the air rises in the heating chamber, air is drawn into the latter from the circulating duct, which in turn, draws air from the rooms through the outlets 29. Thus, there is a continual circulation of warm air through the duct under the entire floor area of the house.

With the heating set-up illustrated in the drawings, comparatively little extra fuel is required for heating a house since the heater 61 may be a cook stove which is in use part of the time and it is always heating water for the hot water tank. If the control valve 64 is used, the coil 60 is actually a by-pass, and when the temperature in the heating chamber rises to a predetermined point, the valve is operated to direct the hot water to the tank 62 until the temperature in the heating chamber drops. If the heating chamber is large enough to accommodate the tank 62, more of the heat generated is utilized, but it is not possible to control the temperature of the air in the chamber.

In the form of the invention illustrated in Figure 4, a heater 71 is provided for the purpose of supplying heat to the rooms of the house. Air is drawn from the circulating duct into the heating chamber 77, and then directed through the distributing duct 74 and out through the outlets 75 into the rooms.

If it is desired to create a faster circulation than would normally take place in this system, a fan 40 may be used.

One of the advantages of this system is that when it is desired to change the air in the house, this may be done without opening any windows or doors. It is only necessary to open the air inlet or inlets 50 for a desired length of time so that fresh air is drawn into the circulating duct. This air passes through the heating chamber where it is heated and then directed into the rooms. Thus, the air is heated before it enters the rooms. The temperature of this air may be regulated to a certain degree by controlling the outlet 44 at the top of the heating chamber.

If the house is cold and it is desired to heat it up quickly, the outlet 56 in the bottom of the chimney 55 may be opened so that the draft in said chimney will suck the cold air out of the rooms through the distributing duct. When the rooms begin to warm up, this air outlet may be closed.

Figure 9 illustrates an alternate method of creating a space between the ends of the joists and the adjacent house wall. This is accomplished by terminating the joist 20 short of the wall 11. In order to prevent the floor 19 from being weakened at this point, baffles 80 are inserted between the floor and the base 24 diagonally across the corners 81 formed by the two adjacent joists 20 which extend to the wall. These baffles form a passage 82 around the joist end and serve to deflect air from one run between the joints through the passage into the next run. Additional floor support and deflector means is provided by inserting a V-shaped baffle 83 in the center of the passage 82 with its sides substantially parallel with the adjacent baffles 80. This actually divides the passage 82 into two passages around the free end of a joist. The baffles 80 and 83 deflect air through the passage 82 created by them and lessen the resistance to the flow of said air from one transverse run into the next run on the opposite side of the joist. This construction greatly reduces the resistance to the flow of air around the joist ends without weakening the floor at these points.

While baffles 80 have been included with each V-shaped baffle 83, it is to be understood that the latter may be used alone. Each V-shaped baffle is positioned centrally of the space at the end of its joist and has its open end 86 facing said joist end.

What I claim as my invention is:

1. Apparatus for heating houses having walls defining at least one room and a ceiling therefor, comprising a base, a plurality of spaced parallel joists on the base, a floor laid on the joists, one end of each joist extending to a wall of the house and the opposite end thereof being spaced from the opposite house wall, said joists being alternately arranged with the spaced end of each joist near the wall opposite that of the spaced end of each joist next thereto, the spaces between and at the ends of the joists forming a continuous circulating duct winding back and forth beneath the house floor in a plurality of transverse runs, a baffle extending between the base and floor in each space at a joist end for directing air around said end, a cold air outlet in each room of the house adjacent the floor communicating with the duct, a vertical heating chamber communicating at its lower end with the duct, means in the heating chamber for heating the air therein, a distribution duct adjacent the house ceiling communicating with the upper end of the heating chamber, and a hot air outlet in the distribution duct for and communicating with each room.

2. Apparatus for heating houses as claimed in claim 1 in which the baffle in each space at a joist end is V-shaped and extends between the base and the floor, the open end of each V-shaped baffle facing its joist end.

3. Apparatus for heating houses having walls defining at least one room and a ceiling therefor, comprising a base, a plurality of spaced parallel joists on the base, a floor laid on the joists, one end of each joist extending to a wall of the house and the opposite end thereof being spaced from the opposite house wall, said joists being alternately arranged with the spaced end of each joist near the wall opposite that of the spaced end of each joist next thereto, the spaces between and at the ends of the joists forming a continuous circulating duct winding back and forth beneath the house floor in a plurality of transverse runs, baffles between the base and the floor extending across the corners formed by the wall and the joists on each side of every joist end spaced from said wall, a cold air outlet in each room of the house adjacent the floor communicating with the duct, a vertical heating chamber communicating at its lower end with the duct, means in the heating chamber for heating the air therein, a distribution duct adjacent the house ceiling communicating with the upper end of the heating chamber, and a hot air outlet in the distribution duct for and communicating with each room.

4. Apparatus for heating houses as claimed in claim 3 including a V-shaped baffle located centrally of each space at a joist end with its sides substantially parallel with the corner baffles of the adjacent joists.

5. Apparatus for heating houses having walls defining at least one room and a ceiling therefor, comprising a base, a plurality of spaced parallel joists on the base, a floor laid on the joists, one end of each joist extending to a wall of the house and at least a portion of the opposite end thereof being spaced from the opposite house wall, said joists being alternately arranged with the partially spaced end of each joist near the wall opposite that of the partially spaced end of each joist next thereto, the spaces between and at the ends of the joists forming a continuous circulating duct winding back and forth beneath the house floor in a plurality of transverse runs, a controlled air inlet through the house wall communicating with the duct and the atmosphere outside the house, a cold air outlet in each room of the house adjacent the floor communicating with the duct, a vertical heating chamber communicating at its lower end with the duct, means in the heating chamber for heating the air therein, a distribution duct adjacent the house ceiling communicating with the upper end of the heating chamber, a hot air outlet in the distribution duct for and communicating with each room, and a controlled air outlet communicating with the distribution duct near the top thereof and the atmosphere outside the house.

6. Apparatus for heating houses having walls defining at least one room and a ceiling therefor, comprising a base, a plurality of spaced parallel joists on the base, a floor laid on the joists, one end of each joist extending to a wall of the house and the opposite end thereof being spaced from the opposite house wall, said joists being alternately arranged with the spaced end of each joist near the wall opposite that of the spaced end of each joist next thereto, the spaces between and at the ends of the joists forming a continuous circulating duct winding back and forth beneath the house floor in a plurality of transverse runs, a baffle extending between the base and floor in each space at a joist end for directing air around said end, a controlled air inlet through the house wall communicating with the duct and the atmosphere outside the house, a cold air outlet in each room of the house adjacent the floor communicating with the duct, a vertical heating chamber communicating at its lower end with the duct, means in the heating chamber for heating the air therein, a distribution duct adjacent the house ceiling communicating with the upper end of the heating chamber, a hot air outlet in the distribution duct for and communicating with each room, and a controlled air outlet communicating with the distribution duct near the top thereof and the atmosphere outside the house.

References Cited in the file of this patent

UNITED STATES PATENTS

| | | |
|---|---|---|
| 5,001 | Hawley | July 23, 1872 |
| 373,495 | Stafford | Nov. 22, 1887 |
| 1,086,031 | Davis | Feb. 3, 1914 |
| 1,406,852 | Haden | Feb. 14, 1922 |
| 2,029,574 | Knudsen | Feb. 4, 1936 |
| 2,273,176 | Burt | Feb. 17, 1942 |
| 2,399,985 | Chandler | May 7, 1946 |
| 2,465,184 | Alderman | Mar. 22, 1949 |
| 2,572,888 | Stein | Oct. 30, 1951 |